United States Patent [19]
Ishitoku et al.

[11] Patent Number: 5,811,527
[45] Date of Patent: Sep. 22, 1998

[54] LIGNIN COMPOSITION, METHOD OF PRODUCING THE SAME AND DISPERSING AGENT FOR CEMENT USED THE SAME

[75] Inventors: Hideaki Ishitoku, Iwakuni; Toshihiro Sugiwaki, Yamaguchi-ken; Masanobu Kawamura; Tomoyuki Nakamoto, both of Iwakuni, all of Japan

[73] Assignee: Nippon Paper Industries Co., Ltd., Tokyo, Japan

[21] Appl. No.: 722,988

[22] Filed: Sep. 30, 1996

[30] Foreign Application Priority Data

Oct. 11, 1995 [JP] Japan ................................ 7-262749

[51] Int. Cl.⁶ .............................. C08H 5/02; B01F 17/50
[52] U.S. Cl. ........................ 530/506; 106/657; 106/719
[58] Field of Search .......................... 530/506; 106/638, 106/657, 719, 724, 218

[56] References Cited

U.S. PATENT DOCUMENTS

| | | | |
|---|---|---|---|
| 3,270,001 | 8/1966 | Morimoto et al. | 530/506 |
| 3,347,788 | 10/1967 | Sohn et al. | 530/506 |
| 3,668,123 | 6/1972 | Steinberg et al. | |
| 4,367,094 | 1/1983 | Fujimaru et al. | 106/90 |

*Primary Examiner*—Nathan M. Nutter
*Attorney, Agent, or Firm*—Oblon, Spivak, McClelland, Maier & Neustadt, P.C.

[57] ABSTRACT

A lignin composition having a content of aluminum or iron or both at 0.05 to 5 wt. % (based on the solids of the lignin solution) and a content of extracts with chlorotrifluoroethylene dimer at 0.01 to 0.4 wt. % (based on solids in lignin solution). The lignin compositions possess high surface tension and are suitable as dispersing agents for cement.

10 Claims, No Drawings

LIGNIN COMPOSITION, METHOD OF PRODUCING THE SAME AND DISPERSING AGENT FOR CEMENT USED THE SAME

BACKGROUND OF THE INVENTION

1. Field of the Invention

The present invention relates to a lignin composition, method of producing the same and dispersing agent for cement using the same.

Known lignin compositions include sulfomethylated products of kraft pulp (hereinafter abbreviated as KP) waste liquor or KP lignin purified with sulfite and formaldehyde, lignin sulfonic acid obtained from sulfite pulp (hereinafter abbreviated as SP) waste liquor, partially desulfonated products thereof, and the like. They are used most frequently in a wide range of industrial fields such as dyes, cement, inorganic and organic pigments, gypsum, coal-water slurries, agricultural chemicals and ceramics.

Moreover, conventional lignin compositions have low surface tension due to the surface active action originating from hydrophobic substances contained therein which pose a problem depending on the use. For this reason, extraction methods using hydrophobic solvents such as $\eta$-hexane are commonly used to selectively reduce and eliminate hydrophobic substances from aqueous solutions containing these substances as well as aqueous solutions of lignin compositions. However, the extraction requires the treatment of waste solvent after extraction and, even if the solvent is reclaimed for re-use, the reclamation involves a considerable cost.

On the other hand, when using conventional lignin compositions as dispersing agents for cements to be used in large quantities in the civil engineering and construction fields, the low surface tension resulting from the surface-active action of hydrophobic substances in the lignin composition resulted in high air entrainment into the cement. Hence, the reduction in surface tension has been recognized as causing a problem.

For this reason, methods have been proposed to eliminate the problem. One such method involved ultrafiltration of lignin sulfonic acid to eliminate impurities and low molecular lignins not concerned with the dispersibility (Japanese Patent Publication No. Sho 58-6703 and Sho 59-3953). However, these efforts were still insufficient.

The present inventors investigated the hydrophobic substances existing in the pulp waste liquor. As a result of their extensive investigations, they discovered a solution to the aforementioned problems using simple and economical means without solvent extraction.

2. Objects of the Invention

The first object of the invention is to provide a novel lignin composition with high surface tension.

The second object of the invention is to provide a simple and economical method of producing lignin compositions with high surface tension.

The third object of the invention is a dispersing agent for cement which provides low air entrainment capable of increasing the strength of cement on hardening.

SUMMARY OF THE INVENTION

The first object of the invention has been achieved by a lignin composition containing either an aluminum compound or an iron compound or both in lignin solutions such as pulp waste liquor in an amount of 0.05 to 5 wt. % (based on the solids in the lignin solution) and wherein the content of extracts with chlorotrifluoroethylene dimer is in the range of 0.01 to 0.4 wt. % (based on the solids in the lignin solution).

Moreover, the second object of the invention has been achieved by a method of producing lignin composition by adding a water-soluble aluminum compound or a water-soluble iron compound or both to lignin solutions, followed by conducting a reaction therebetween.

Furthermore, the third object of the invention has been achieved by a dispersing agent suitable for use in cement compositions, said dispersing agent comprising a lignin composition containing an aluminum compound or an iron compound or both in a lignin solution in an amount of 0.05 to 5 wt. % (based on the solids in the lignin solution) and the content of extracts with chlorotrifluoroethylene dimer (hereinafter abbreviated as CTFE) being in the range of 0.01 to 0.4 wt. % (based on the solids in the lignin solution).

DETAILED DESCRIPTION OF THE INVENTION

In the following description, the invention will be illustrated in more detail.

Suitable lignin solutions to be used in the production of the inventive lignin compositions include SP waste liquor, sulfomethylated products of KP waste liquor and/or KP lignin purified from KP waste liquor with sulfite and formaldehyde, condensates of KP lignin and sulfanilic acid with formaldehyde, etc.

Preferably, lignin solutions are used which are obtained by purifying pulp waste liquor through ultrafiltration or obtained by alkali treatment and oxidation treatment of pulp waste liquor. These have been found to be more effective for increasing surface tension.

The wood species to be employed as the raw materials of the lignin solution include hardwood, softwood or mixtures thereof. Further, fermentation products of these lignin solutions and pulp waste liquors with microorganisms such as yeast may also be used safely.

The water-soluble aluminum compounds and water-soluble iron compounds to be added to these lignin solutions, include trivalent aluminum compounds such as aluminum sulfate, aluminum chloride, aluminum acetate and sodium aluminate; sulfates and chlorides containing bivalent or trivalent iron such as ferrous sulfate, ferric sulfate, ferrous chloride and ferric chloride; and additionally, compounds containing trivalent metals such as chromium and cobalt and hexavalent chromium, and the like. Aluminum sulfate and iron sulfate are most preferable from the standpoint of low cost, easy handling, lack of toxicity and the like.

The water-soluble aluminum compound and water-soluble iron compound can also be used in combination. At times, depending on the use of the lignin composition, the presence of a single aluminum or iron compound may be inadequate but the combined use of both is effective because of reducing the amount of a single compound of aluminum or iron.

The addition amount of the water-soluble aluminum compound and water-soluble iron iron compound in the lignin solution is controlled so that the content of either aluminum or iron or both in the lignin composition after completion of the reaction falls within the range of 0.5 to 5 wt. % (based on the solids in the lignin solution).

Before adding the water-soluble aluminum compound and water-soluble iron compound, it is preferable to adjust the pH value of the lignin solution in a range from 5 to 8.

The reaction temperature employed after addition of the water-soluble aluminum or iron compound ranges around 40° C. to 100° C., preferably 70° C. to 100° C. If the reaction temperature is lower than this, the desired effect decreases and the need arises for a longer reaction time, which is impractical. If the reaction temperature is higher than this, no problem occurs in obtaining the desired effect, but pressure vessels such as an autoclave become necessary, which is uneconomical.

Moreover, reaction times of about 20 minutes or longer are common, preferably in the range from 60 to 120 minutes.

After the completion of the reaction as above, any necessary adjustment of the pH value is made to obtain the lignin composition of the invention.

The content of the aluminum or iron or both in the lignin composition after completion of the reaction preferably is not less than 0.05 wt. % (based on the solids in the lignin solution). If the content of aluminum or iron in the lignin composition is lower than this, then the desired effect of increasing the surface tension is lowered.

Moreover, with respect to the upper limit of the content of aluminum and iron, i.e., around 5 wt. % preferably 2 wt. % (based on the solids in the lignin solution), amounts greater than this are economically disadvantageous and result in a decrease in the lignin content of the lignin composition and this is undesirable.

The amount of CTFE extracts in the lignin composition after reaction is suitably within a range from 0.01 to 0.4 wt. % (based on the solids in the lignin solution), preferably within a range from 0.01 to 0.2 wt. %.

If the amount of CTFE extracts is less than 0.01 wt. %, the addition level of water-soluble aluminum compound and/or water-soluble iron compound increases, which is undesirable. Also, if the amount of CTFE extracts exceeds 0.4 wt. %, the desired effect of increasing the surface tension is lowered and this is undesirable.

In the invention, the amount of CTFE extracts is used as an index of the amount of hydrophobic substances contained in the lignin composition. Thus, by adding and reacting the water-soluble aluminum compound or water-soluble iron compound or both, the hydrophobic substances in the lignin composition are changed to substances unextractable with chlorotrifluoroethylene dimer, thereby resulting in an increase in surface tension of the aqueous lignin composition and a decrease in air entrainment as well. Besides, the content of aluminum and iron in the lignin composition can be simply determined by atomic absorption measurement with, for example, an atomic absorption-flame dual analytical apparatus, such as AA-860 from Nihon Jourrel-Ash Co., Ltd., etc.

Moreover, the amount of CTFE extracts was measured using a portable oil measuring apparatus (OIL-1 05) from Anatec-Yanaco Co., according to JIS K0102-1993 (Carbon Tetrachloride Extraction-Infrared Analytical Method) relating to a test method of industrial effluent. For the extracting solvent, chlorotrifluoroethylene dimer (trade name S-316, from Horiba Co., Ltd.) was used.

The inventive lignin composition has the features of high surface tension and low air entrainment when using it as a dispersing agent for cement as described above.

When using the inventive lignin composition as a dispersing agent for cement, suitable cements include Normal Portland cement, high early strength Portand cement, ultra-high early strength Portland cement, Portland blast furnace slag cement, moderate heat Portland cement, fly ash cement, sulfate resisting cement, high-belite type low-exothermic cement, and the like.

Moreover, other additives for cement can be used in combination; for example, water-reducing agent, air-entraining agent, setting retarder, water-proofing agent, inflating agent, silica fume, stone powder, etc.

The inventive lignin composition can be used in combination with other known dispersing agents, for example bisphenols·aminobenzenesulfonic acid·formaldehyde condensate (hereinafter abbreviated as BAF), phenols·aminobenzenesulfonic acid·formaldehyde condensate, naphthalenesulfonic acid·formaldehyde condensate, melaminesulfonic acid·formaldehyde condensate, polycarboxylic dispersing agent, polyether type dispersing agent, etc. Above all, the combined use with bisphenols·aminobenzesulfonic acid·formaldehyde condensate can give excellent results for improving the effects of fluidity etc. in addition to the decreased air entrainment and increased strength on hardening.

For the bisphenols·aminobenzenesulfonic acid·formaldehyde condensate, a known manufacturing method, for example, is described in Japanese Unexamined Patent Publication No. Hei 6-93067.

The level of the inventive dispersing agent for cement is within a range from 0.01 to 2.0%, preferably from 0.1 to 0.6%. If the addition level is under 0.1%, expected effects cannot be achieved and, if over 0.6%, the cement disperses excessively to cause a segregating phenomenon, which is undesirable.

EXAMPLES

In the following, the invention will be illustrated in more detail based on the Examples, but the invention is not restricted to them.

Example 1

Using non-fermented Na base SP waste liquor from softwood (amount of CTFE extracts: 0.50 wt. % based on the solids in the lignin solution) as a lignin solution, the pH value of the solution was adjusted to 7, then aluminum sulfate was added under stirring in an amount of 2.0 wt. % (based on lignin solids) in terms of aluminum, and the mixture was reacted for 1 hour at a temperature of 90° C. Thereafter, this was cooled to obtain lignin composition (amount of CTFE extracts: 0.08 wt. % based on the solids in the lignin solution, content of aluminum: 2.0 wt. % based on the solids in the lignin solution).

Example 2

Using yeast-fermented Ca base SP waste liquor from mixed softwood and hardwood (amount of CTFE extracts: 0.58 wt. % based on solids) as a lignin solution, the pH value was adjusted to 5, then ferric sulfate was added under stirring in an amount of 0.12 wt. % (based on lignin solids) in terms of iron, and the mixture was reacted for 2 hours at a temperature of 80° C. Thereafter, this was cooled to obtain a lignin composition (amount of CTFE extracts: 0.10 wt. % based on the solids in the lignin solution, content of iron: 0.12 wt. % based on the solids in the lignin solution).

Example 3

A KP bleaching waste liquor from softwood was warmed to 70° C. and, after adjusting to pH 3 with 10 wt. % aqueous solution of sulfuric acid, precipitated lignin was filtered and washed thrice with water. The precipitation of lignin thus obtained were dissolved into aqueous alkali (pH 9/solids 30 wt. %) and 9 wt. % (based on the solids in the lignin solution) of sodium sulfite were added, the temperature of which was then raised to 90° C. under stirring.

Following this, 120 mol % (based on sodium sulfite) of formaldehyde (37 wt. % aqueous solution of formaldehyde) were added successively over 1 hour and then reaction was conducted for 19 hours at a temperature of 130° C. The sulfomethylated KP lignin thus obtained was prepared as a lignin solution (amount of CTFE extracts: 0.70 wt. % based on the solids in the lignin solution) to be used for subsequent reaction.

Next, to this lignin solution (adjusted to pH 6), were added aluminum acetate in an amount of 0.040 wt. % (based on the solids in the lignin solution) in terms of aluminum and aluminum sulfate in an amount of 0.040 wt. % (based on the solids in the lignin solution) in terms of aluminum under stirring and the reaction was conducted for 30 minutes at a temperature of 70° C.

Thereafter, this mixture was cooled to obtain a lignin composition (amount of CTFE extracts: 0.14 wt. % based on the solids in the lignin solution, content of aluminum: 0.089 wt. %).

Example 4

A KP bleaching waste liquor from softwood was warmed to 70° C. and, after adjustment to pH 3 with 10 wt. % aqueous sulfuric acid, precipitated lignin was filtered and washed twice with water. The precipitates thus obtained were dissolved into aqueous alkali (pH 9/solids 30 wt. %) and 9 wt. % (based on the solids in the lignin solution) of sulfanilic acid were added, with the temperature then raised to 90° C. under stirring.

Following this, 110 mol % (based on sulfanilic acid) of formaldehyde (37 wt. % aqueous solution of formaldehyde) were added successively over 1 hour and then reaction was conducted for 20 hours at a temperature of 90° C. The formaldehyde condensate of KP lignin and sulfanilic acid thus obtained was made as a lignin solution (amount of CTFE extracts: 0.65 wt. %) to be used for subsequent reaction.

Next, to this lignin solution (adjusted to pH 8), sodium aluminate was added in an amount of 0.080 wt. % in terms of aluminum under stirring and the reaction was conducted for 1 hour at a temperature of 70° C.

Thereafter, this solution was cooled to obtain lignin composition (amount of CTFE extracts: 0.18 wt. %, content of aluminum: 0.082 wt. %.).

Example 5

A yeast-fermented Ca base SP waste liquor from softwood was made as a lignin solution (amount of CTFE extracts: 0.50 wt. %) to be used for subsequent reaction.

Next, to this lignin solution (adjusted to pH 7), ferrous sulfate (II) was added in an amount of 0.050 wt. % (based on the solids in the lignin solution) in terms of iron under stirring and, after reaction for 7 hours at a temperature of 80° C., this was cooled to obtain a lignin composition (amount of CTFE extracts: 0.35 wt. %, content of iron: 0.051 wt. %).

Example 6

A non-fermented Mg base SP waste liquor from softwood was subjected to alkali reaction (addition level of sodium hydroxide 6 wt. % based on lignin solids/reaction temperature 70° C./reaction time 20 hours) and oxidation reaction (oxygen treatment/pressure of oxygen 50 kPa/reaction time 10 hours), and this was made into a lignin solution (amount of CTFE extracts: 0.60 wt. %) for subsequent reaction.

Next, to this lignin solution (adjusted to pH 7), were added ferric chloride (III) in an amount of 0.5 wt. % (based on the solids in the lignin solution) in terms of iron and aluminum sulfate in an amount of 0.5 wt. % in terms of aluminum under stirring and, after reaction for 1 hour at a temperature of 100° C., this was cooled to obtain lignin composition (amount of CTFE extracts: 0.05 wt. %, content of iron: 0.50 wt. %, content of aluminum: 0.50 wt. % respectively).

Example 7

A non-fermented Na base SP waste liquor from softwood was subjected to ultrafiltration (treated with ultrafiltration membrane of fractionating molecular weight of 50,000 until the reducible sugars in the concentrate reached 5 wt. % based on solids), and the concentrate was a lignin solution (amount of CTFE extracts: 0.67 wt. %) to be used for subsequent reaction.

Next, to this lignin solution (adjusted to pH 5), ferric sulfate (III) was added in an amount of 0.50 wt. % in terms of iron and the reaction was conducted for 2 hours at a temperature of 80° C. to obtain lignin composition (amount of CTFE extracts: 0.40 wt. %, content of iron: 0.50 wt. %).

Example 8

To the lignin solution (adjusted to pH 8) used in Example 4, aluminum chloride was added in amount of 4.5 wt. % in terms of aluminum and the reaction was conducted for 20 minutes at a temperature of 40° C. to obtain a lignin composition (amount of CTFE extracts: 0.36 wt. %, content of aluminum: 4.5 wt. %).

Example 9

To the lignin solution (adjusted to pH 9) used in Example 1, ferrous chloride (II) was added in an amount of 0.05 wt. % in terms of iron and the reaction was conducted for 2 hours at a temperature of 30° C. to obtain a lignin composition (amount of CTFE extracts: 0.38 wt. %, content of iron: 0.06 wt. %).

Example 10

To the lignin solution (adjusted to pH 5) used in Example 2, sodium aluminate was added in an amount of 0.2 wt. % in terms of aluminum and the reaction was conducted for 10 minutes at a temperature of 50° C. to obtain lignin composition (amount of CTFE extracts: 0.40 wt. %, content of aluminum: 0.20 wt. %).

Example 11

To the lignin solution (adjusted to pH 2) used in Example 3, ferrous sulfate (II) was added in an amount of 5.0 wt. % in terms of iron and the reaction was conducted for 20 minutes at a temperature of 70 ° C. to obtain a lignin composition (amount of CTFE extracts: 0.38 wt. %, content of iron: 5.0 wt. %).

Comparative Example 1

The non-fermented Na base SP waste liquor from softwood used in Example 1 was made as a lignin composition of Comparative Example 1 (amount of CTFE extracts: 0.50 wt. % based on the solids in the lignin solution).

Comparative Example 2

The fermented Ca base SP waste liquor from mixed softwood and hardwood used in Example 2 was made as a lignin composition of Comparative Example 2 (amount of CTFE extracts: 0.58 wt. % based on the solids in the lignin solution).

Comparative Example 3

The KP bleaching waste liquor from softwood used in Example 3 was sulfomethylated by a method similar to Example 3 to make a lignin composition of Comparative Example 3 (amount of CTFE extracts: 0.70 wt. %).

Comparative Example 4

The formaldehyde condensate of KP lignin and sulfanilic acid obtained by condensing KP bleaching waste liquor from softwood used in Example 4 by a method similar to Example 4 was made as a lignin composition of Comparative Example 4 (amount of CTFE extracts: 0.65 wt. %).

Comparative Example 5

The yeast-fermented Ca base SP waste liquor from softwood used in Example 5 was made as a lignin composition of Comparative Example 5 (amount of CTFE extracts: 0.50 wt. %).

Comparative Example 6

The non-fermented Mg base KP waste liquor from softwood used in Example 6 was subjected to alkali reaction and oxidation reaction by methods similar to Example 6 to make a lignin composition of Comparative Example 6 (amount of CTFE extracts: 0.60 wt. %).

Comparative Example 7

The condensate obtained by subjecting the non-fermented Na base SP waste liquor from softwood to ultrafiltration by a method similar to Example 7 was made as a lignin composition of Comparative Example 7 (amount of CTFE extracts: 0.67 wt. %).

Comparative Example 8

To the lignin composition of Comparative Example 1, water-insoluble ferric oxide (III) was added in an amount of 0.2 wt. % (based on solids in lignin solution) in terms of iron and the reaction was conducted for 5 hours at a temperature of 90° C. to make a lignin composition of Comparative Example 8 (amount of CTFE extracts: 0.50 wt. %, content of iron: 0.2 wt. %).

Comparative Example 9

To the lignin composition used in Comparative Example 2, zinc sulfate was added in an amount of 1.3 wt. % in terms of zinc and the reaction was conducted for 5 hours at a temperature of 90° C. to make a lignin composition of Comparative Example 9 (amount of CTFE extracts: 0.56 wt. %, content of zinc: 1.3 wt. %).

The surface tension of each of the lignin compositions of the Examples and the Comparative Examples was measured. The results are shown in Table 1.

The measurement of surface tension was performed at lignin concentrations in the composition of 0.5 wt. % and 1.0 wt. % (pH 7.5/20° C. in a thermostatic chamber), using a platinum plate on a Wilhelmy's surface tension measuring apparatus (CBVF-A3) obtained from Kyowa Surface Science, Co., Ltd.

TABLE 1

Results of surface tension measurement

| | Surface tension × $10^2$ (N/m) | |
|---|---|---|
| Type of lignin composition | Concentration 0.5 wt. % | Concentration 1.0 wt. % |
| Example 1 | 6.4 | 6.1 |
| Example 2 | 6.4 | 6.1 |
| Example 3 | 6.3 | 6.0 |
| Example 4 | 6.2 | 5.9 |
| Example 5 | 6.0 | 5.7 |
| Example 6 | 6.5 | 6.2 |
| Example 7 | 6.5 | 6.2 |
| Example 8 | 6.0 | 5.7 |
| Example 9 | 5.9 | 5.6 |
| Example 10 | 5.8 | 5.5 |
| Example 11 | 5.9 | 5.6 |
| Comparative Example 1 | 4.9 | 4.5 |
| Comparative Example 2 | 4.8 | 4.5 |
| Comparative Example 3 | 4.6 | 4.2 |
| Comparative Example 4 | 4.7 | 4.3 |
| Comparative Example 5 | 4.9 | 4.5 |
| Comparative Example 6 | 4.7 | 4.4 |
| Comparative Example 7 | 4.6 | 4.2 |
| Comparative Example 8 | 4.7 | 4.4 |
| Comparative Example 9 | 4.9 | 4.5 |

As evident from the results of Table 1, the lignin compositions of Example 1 through 11 had higher surface tension either at a concentration of 0.5 wt.% or at a concentration of 1.0 wt. % compared with the lignin compositions of Comparative Examples 1 through 9.

Next, employing each lignin composition of the Examples and Comparative Examples above, concrete tests were carried out. For the concrete test, the formulating proportions shown in Table 2 of cement, aggregates and 0.20 wt. % dispersing agent (based on the cement) were kneaded for 3 minutes in a 100-liter portable tilting type mixer to prepare concrete. The amount of air in the concrete was measured according to the methods of JIS. The results are shown in Table 3.

TABLE 2

Formulating proportion of Concrete

| W/C | S/a | Unit weight[1] (kg/m$^3$) | | | |
|---|---|---|---|---|---|
| [%] | [%] | C | W | S | G |
| 52.2 | 47.0 | 320 | 167 | 843 | 950 |

Note
[1])C cement: a mixture of three types of common Portland cements, specific gravity 3.16
W water: tap water
S small aggregate: land sand from Kimizu/crushed sand from Kodama = 7/3, specific gravity 2.61, F.M. (fineness modulus) 2.73
G great aggregate: crushed stone from Oume, specific gravity 2.61, F.M. (fineness modulus) 6.68

TABLE 3

Test results of concrete*

| Types of Dispersing Agent | Amount of Air (%) |
|---|---|
| Example 1 | 2.7 |
| Example 2 | 2.9 |
| Example 3 | 3.0 |
| Example 4 | 3.2 |
| Example 5 | 3.6 |
| Example 6 | 2.5 |
| Example 7 | 2.5 |
| Example 8 | 3.7 |
| Example 9 | 4.0 |
| Example 10 | 4.2 |
| Example 11 | 4.0 |
| Comparative Example 1 | 7.2 |
| Comparative Example 2 | 7.5 |
| Comparative Example 3 | 9.0 |
| Comparative Example 4 | 8.2 |
| Comparative Example 5 | 7.3 |
| Comparative Example 6 | 7.7 |
| Comparative Example 7 | 8.0 |
| Comparative Example 8 | 7.2 |
| Comparative Example 9 | 7.4 |

*Addition rate of dispersing agent: 0.20 wt. % (based on cement)

As evident from Table 3, the lignin compositions of Examples 1 through 11 showed lesser amounts of air in concrete compared with the lignin compositions of Comparative Examples 1 through 9.

Moreover, using mixtures (solids ratio 1:1) of the lignin compositions in Example 7 and Comparative Example 7 and bisphenols-aminobenzensulfonic acid-formaldehyde condensate (prepared by the method described in Japanese Unexamined Patent Publication No. Hei-6-93067), concretes were prepared by the same method as above to measure the length of slump and the amount of air according to the methods of JIS. The results are shown in Table 4.

TABLE 4

Test results of concrete*

| Type of Dispersing Agent | Slump (cm) | Amount of Air (%) |
|---|---|---|
| Example 7: BAF = 1:1 | 19.5 | 2.2 |
| Comparative Example 7: BAF = 1:1 | 17.5 | 6.7 |

*Addition rate of dispersing agent: 0.20 wt. % (based on cement)

As evident from Table 4, the mixture of the lignin composition of Example 7 and bisphenols-aminobenzenesulfonic acid-formaldehyde condensate showed improved fluidity (slump) in addition to decreased amount of air in concrete compared with the mixture of the lignin composition of Comparative Example 7 and bisphenols-aminobenzenesulfonic acid-formaldehyde condensate.

Furthermore, employing the lignin compositions of Examples 1 through 11 and Comparative Examples 1 through 9, concretes were prepared in the formulating proportion shown in Table 2 so that the amount of air therein was 4.0±0.3% with added AE agent or defoamer, and the compressive strength of concrete after hardening was measured according to the method of JIS. The results are shown in Table 5.

TABLE 5

Test results of concrete

| Types of Dispersing Agent | Addition Level (wt. % based on cement) | | | Compressive Strength (N/mm$^2$) | | |
|---|---|---|---|---|---|---|
| | Dispersing Agent | AE agent | De-foamer | 3 days | 7 days | 28 days |
| Example 1 | 0.2 | 0.0033 | without addition | 19.6 | 28.4 | 34.0 |
| Example 2 | " | 0.0031 | without addition | 19.5 | 28.2 | 33.7 |
| Example 3 | " | 0.0030 | without addition | 19.5 | 28.1 | 33.5 |
| Example 4 | " | 0.0026 | without addition | 19.4 | 27.9 | 33.3 |
| Example 5 | " | 0.0010 | without addition | 19.4 | 27.8 | 33.2 |
| Example 6 | " | 0.0040 | without addition | 19.6 | 28.6 | 34.1 |
| Example 7 | " | " | without addition | 19.7 | 28.7 | 34.2 |
| Example 8 | " | without addition | without addition | 19.3 | 27.7 | 33.1 |
| Example 9 | " | without addition | without addition | 19.3 | 27.7 | 33.0 |
| Example 10 | " | without addition | without addition | 19.3 | 27.6 | 33.0 |
| Example 11 | " | without addition | without addition | 19.3 | 27.7 | 33.0 |
| Comparative Example 1 | " | without addition | 0.0040 | 19.0 | 26.9 | 32.0 |
| Comparative Example 2 | " | without addition | 0.0045 | 19.0 | 26.9 | 31.9 |
| Comparative Example 3 | " | without addition | 0.0062 | 18.9 | 26.8 | 31.7 |
| Comparative Example 4 | " | without addition | 0.0053 | 18.9 | 26.8 | 31.6 |
| Comparative Example 5 | " | without addition | 0.0041 | 18.8 | 26.7 | 31.5 |
| Comparative Example 6 | " | without addition | 0.0047 | 19.1 | 27.1 | 32.2 |
| Comparative Example 7 | " | without addition | 0.0051 | 19.1 | 27.1 | 32.2 |
| Comparative Example 8 | " | without addition | 0.0040 | 18.8 | 26.5 | 31.5 |
| Comparative Example 9 | " | without addition | 0.0043 | 18.8 | 26.4 | 31.5 |

As evident from Table 5, the inventive lignin compositions of Examples 1 through 11 provided higher compressive strength in concrete after hardening compared with the lignin compositions of Comparative Examples 1 through 9.

Since the lignin compositions of the invention exhibit high surface tension and are produced simply and economically, They are utilizable in a wide range of industrial fields such as dyes, agricultural chemicals and ceramics.

Moreover, when the lignin compositions of the invention are used as dispersing agents in cement, reductions in air entrainment are possible and the compressive strength of the cement on hardening is high. In particular, a mixture of the lignin compositions of the invention and bisphenols-aminobenzenesulfonic acid-formaldehyde condensate provides improved fluidity in addition to decreased air entrainment in concrete.

What is claimed is:

1. A method of producing a lignin composition comprising adding a water-soluble trivalent aluminum compound selected from the group consisting of aluminum sulfate, aluminum chloride, aluminum acetate and sodium aluminate, or a water-soluble iron compound selected from the group consisting of ferrous sulfate, ferric sulfate, ferrous chloride and ferric chloride to a lignin solution, or a mixture of said water-soluble aluminum compound and said water-soluble iron compound and causing said solution and said water-soluble iron or aluminum compound to react by heating at a temperature in the range of 40° C to 100° C. and at a pH in the range of from 5 to 8.

2. The method of producing a lignin composition as set forth in claim 1 wherein said water-soluble aluminum compound or water-soluble iron compound are added to a lignin solution and the reaction is conducted until the content of extracts with chlorotrifluoroethylene dimer becomes 0.01 to 0.4 wt. % (based on the solids in the lignin solution).

3. A method of producing a lignin composition as set forth in claim 1, wherein the lignin solution is a pulp waste liquor subjected to alkali and oxidation treatment.

4. The method of producing a lignin composition as set forth in claim 1 wherein the lignin solution is a pulp waste liquor purified by ultrafiltration.

5. A lignin composition prepared by a process comprising adding a water-soluble trivalent aluminum compound selected from the group consisting of aluminum sulfate, aluminum chloride, aluminum acetate and sodium aluminate, or a water-soluble iron compound selected from the group consisting of ferrous sulfate, ferric sulfate, ferrous chloride and ferric chloride to a lignin solution, or a mixture of said water-soluble aluminum compound and said water-soluble iron compound and causing said solution and said water-soluble iron or aluminum compound to react by heating at a temperature in the range of 40° C. to 100° C. and at a pH in the range of from 5 to 8.

6. A lignin composition of claim 5, wherein said water-soluble aluminum compound or water-soluble iron compound are added to a lignin solution and the reaction is conducted until the content of extracts with chlorotrifluoroethylene dimer becomes 0.01 to 0.4 wt. % (based on the solids in the lignin solution).

7. A dispersing agent comprising a lignin composition which has been reacted with a water-soluble aluminum compound or a water-soluble iron compound or a mixture of water-soluble aluminum and iron compounds by a process as set forth in claim 1, wherein the content of either aluminum or iron or mixture of aluminum and iron is from 0.05 to 5 wt. % (based on the solids content of the lignin solution), said lignin composition having a content of extracts with chlorotrifluoroethylene dimer of 0.01 to 0.4 wt. % (based on the solids content of the lignin solution).

8. A method of producing a lignin composition as set forth in claim 2 wherein the content of aluminum or iron or mixture thereof is from 0.05 to 5 wt. % (based on the solids content of the lignin solution).

9. A lignin composition according to claim 6 wherein the content of aluminum or iron or mixture thereof is from 0.05 to 5 wt. % (based on the solids content of the lignin solution).

10. A dispersing agent suitable for use in cement compositions, said dispersing agent comprising the lignin composition set forth in claim 7.

* * * * *